June 3, 1969     H. R. BRUET     3,447,407

CARRIAGE CONTROL DEVICES FOR MACHINE TOOLS

Filed Aug. 15, 1966

United States Patent Office 3,447,407
Patented June 3, 1969

3,447,407
CARRIAGE CONTROL DEVICES FOR MACHINE TOOLS
Henri René Bruet, Paris, France, assignor to Etablissements A. Cazeneuve, a French company
Filed Aug. 15, 1966, Ser. No. 572,335
Claims priority, application France, Aug. 27, 1965, 29,651
Int. Cl. B23b 21/00
U.S. Cl. 82—22   2 Claims

ABSTRACT OF THE DISCLOSURE

A mechanism for moving the carriages of a machine tool wherein a motor has operating speeds greater than the rate of rotation of the feeding drive for the carriages and serves to drive the carriages during periods when the tools are inoperative.

---

The present invention relates to improved carriage control devices for machine tools and particularly of transversal and longitudinal carriages in center lathes.

A device of this type is described in French Patent No. 1,022,178 filed on July 19, 1950. In this device, the entry into action or the release of longitudinal and transversal carriages by displacement, particularly by tilting, is effected by an intermediate shaft driven in continuous manner by the feed shaft and selectively couplable, by displacement, with the members which drive the carriages longitudinally or transversely.

It is an object of the present invention to improve devices of this type by the combination with it of complementary members enabling fast return of the carriages, so avoiding the loss of time represented by the periods when the tools are inoperative.

According to the present invention there is provided an improved carriage control device for longitudinal and transverse carriages in center lathes. The control device comprising a displaceable intermediate shaft connected by a transmission with the feed shaft, so as to be permanently driven in rotation thereby and connectable with one or the other of the carriages (longitudinal or transversal) in such a way that its rotational motion communicates to said carriages the required translation. The device includes locking means operable in both directions of rotation, interposed in the transmission between the feed shaft and the displaceable shaft, so as to permit said shaft being driven at a speed greater than the maximal speed which can be communicated to it by the carriage feed shaft.

In order that the invention may be more clearly understood, reference will be made in the description which follows to the accompanying drawings, which show an embodiment thereof by way of non-limiting example, and in which drawings.

Figure 1:
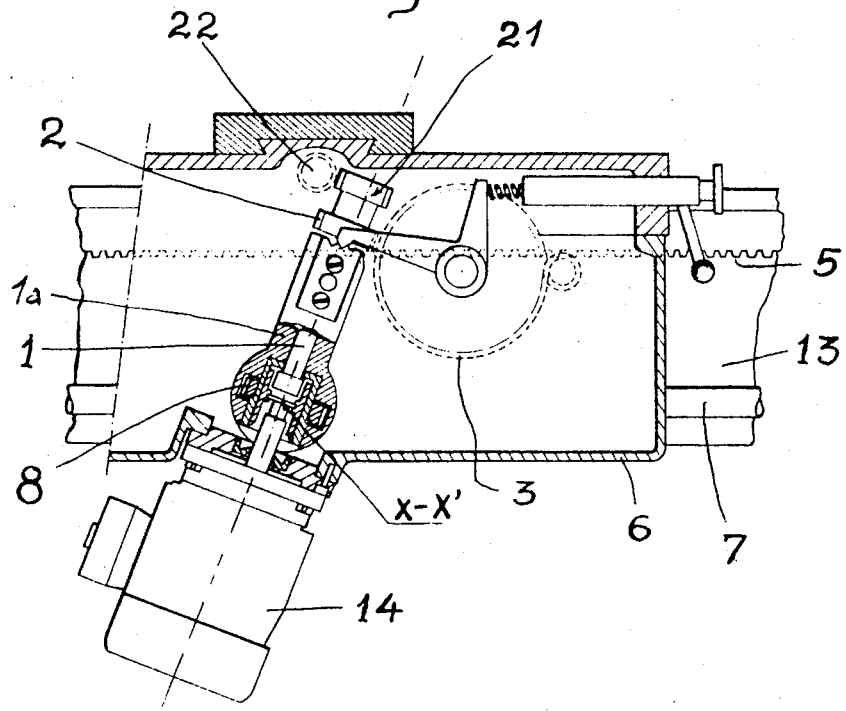
FIGURE 1 shows a portion of the carriage of a center lathe in which the displaceable shaft is a tilting shaft, through a longitudinal section in a plane which passes through the axis of the tilting shaft.
Figure 2:
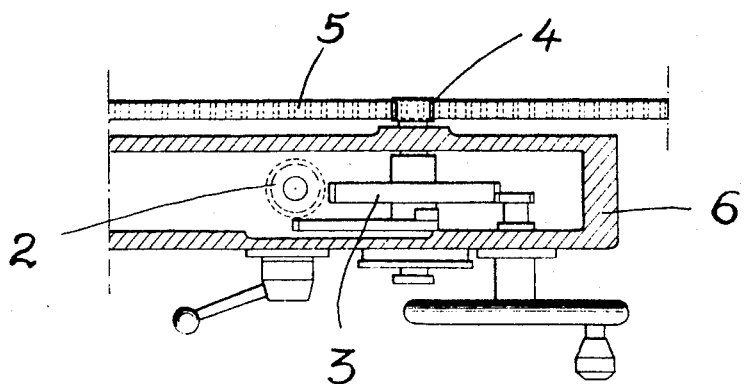
FIGURE 2 shows a horizontal section of the longitudinal carriage.
Figure 3:
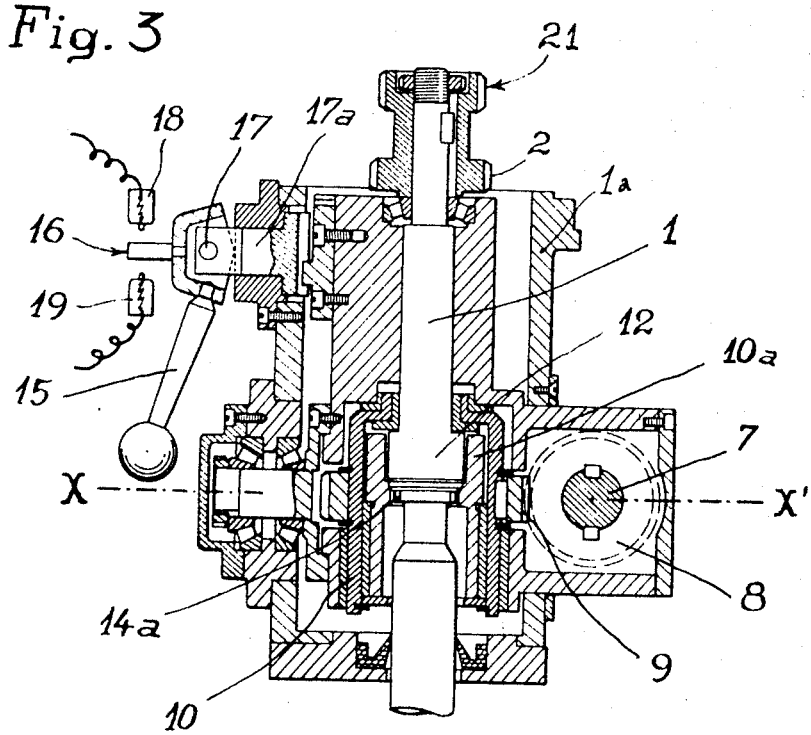
FIGURE 3 shows a section along the axis of the tilting shaft perpendicularly to the feed shaft.
Figure 4:
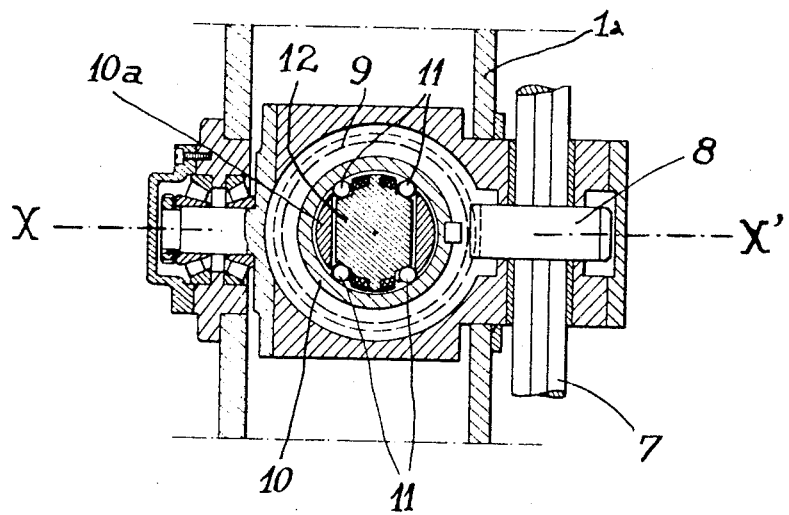
FIGURE 4 shows, in transverse section, along the axis of the feed shaft, the axis of the tilting shaft and the casing which comprises the pawl and ratchet mechanism.

It is seen, FIGURE 1, that the shaft 1 is mounted, in known manner, in a support 1a capable of tilting around X–X', on which shaft is keyed the gear which, by tilting of this support, can selectively come into engagement with the wheel 3 or disengage it. This wheel 3 is mounted on an axis which turns in the apron and upon which is fixed a pinion 4 in mesh with the rack 5, rigidly fixed to the bed of the lathe 13. This arrangement provides travel of the carriage 6, when the feed shaft 7 is put in rotation. The worm 8 (FIGURE 3) keyed on the shaft 7, meshes with a pinion 9, keyed on a tube 10 centered in the tilting support. The tube 10 is arranged perpendicularly to the tilting X–X' axis, and constitutes the outer sprocket wheel of a pawl and ratchet mechanism which includes a sleeve or driving tumbler 10a, centered in the tube 10, and rollers 11 on which this tumbler 10a can act, interposed between the sprocket wheel 10 and a central cam 12. The cam 12 is integral with the shaft 1, which is coupled to the electric motor 14, by the intermediary of a coupling device 14a, located on the tilting axis X–X'. The coupling device allows a slight inclination between the axis of the motor and the shaft 1, while rotation of this motor is transferred to the tumbler 10a of the pawl and ratchet mechanism. The pawl and ratchet mechanism is wedgeable in both directions of rotation as soon as its tumbler 10a turns more quickly than sprocket wheel 10 or in the reverse direction therefrom. The motor 14 is two directional and its direction of rotation may be chosen by manipulation of a handle 15 (FIGURE 3), articulated at 17 by a pin carried on a rotatable shaft 17a so as to participate in its rotation. The shaft 17a is borne by the apron portion of the carriage 6 and its axis is parallel to the axis of tilting of the shaft 1 and perpendicular to the pin 17. On both sides of a contact arm 16 rigidly fixed to the handle 15, are feed contacts 18 and 19 for the electric motor 14 for its two directions of rotation and which can only remain closed by the contact arm 16 being held against them.

Shaft 17a is connected to shaft 1 by a device described in the previously cited patent and which produces the tilting of the support carrying the shaft 1. Over and above the pinion 2, there is keyed on this shaft 1 a pinion 21 which comes into engagement, by tilting of the shaft support 1, with the driving pinion 22 of the transverse carriage.

The operation is as follows:

The main motor (not shown) is set in motion and the feed shaft 7 drives the worm 8 which causes the gear 9 to turn, which drives the tube 10 on which it is keyed. This rotation is transmitted to the cam 12 and to shaft 1 by the rollers 11, which are urged against it. The shaft 1, thus caused to rotate could, according to choice, be tilted by the handle 15 to transmit its movement, either to the longitudinal carriage or to the transversal carriage.

Translation of these carriages takes place in known manner up to the moment of intervention by the electric motor 14, when it is fed from the contacts 18 and 19.

If, for example, the travel of the carriage from the right towards the left is terminated, the electric motor 14 is fed by suitable contact, which actuates the shaft 1, which returns the carriage 6 towards the left at a higher speed than the speed of carriage, ensuring thus a rapid return.

This applies also to the transversal carriage which is operated in a similar manner, for rapid return.

This rapid return may be put into operation instantaneously and at any moment, in any position, without stopping ei*h*er the feed shaft or the main motor.

It will be understood that the invention is not limited to the example given herein above, but it encompasses all analogous or similar devices comprising all or part of the device described, and all arrangements for the pawl and ratchet means, which may be of any nature, either automatic as in the device described, or controlled and may be replaced by any other engageable member.

It comprises also all applications, in particular to all types of machine tools or analogous mechanisms. Furthermore, the coupling device 14a, in place of being located between the motor and the pawl and ratchet means, may be disposed between the cam of the pawl and ratchet means and the shaft 1.

What I claim is:

1. A control device for the carriages of machine tools comprising, a bed, a first carriage including an apron portion moving longitudinally of said bed, a second carriage movable transversely of the first carriage, a feed shaft, a tiltable shaft mounted for rotation on said apron, gear means including a tube surrounding the tiltable shaft transmitting rotation of said feed shaft to said tiltable shaft, means for selectively driving either carriage during rotation of said tiltable shaft, a motor supported on said apron, a motor shaft in general alignment with said tiltable shaft, a flexible coupling device connecting the motor shaft to said tiltable shaft, and a pawl and ratchet mechanism within said tube for driving said tiltable shaft when the rate of rotation of the motor shaft is greater than the rate of rotation of said tube.

2. A control device for the carriages of machine tools according to claim 1 wherein the motor is reversible and the pawl and ratchet mechanism drives the tiltable shaft in either direction of rotation when the rate of rotation of the motor shaft is greater than the rate of rotation of said tube.

References Cited

UNITED STATES PATENTS 1,791,270　2/1931　Groene _____ 82—22

FOREIGN PATENTS 1,022,178　12/1952　France.

LEONIDAS VLACHOS, *Primary Examiner.*